Patented June 22, 1937

2,084,415

UNITED STATES PATENT OFFICE 2,084,415

RESINOUS COMPOSITION AND PROCESS FOR THE MANUFACTURE THEREOF

Daniel E. Strain, Wilmington, Del., assignor to E. I. du Pont de Nemours & Company, Wilmington, Del., a corporation of Delaware No Drawing. Application April 26, 1933, Serial No. 668,081

7 Claims. (Cl. 260—2)

This invention relates to an improved resinous composition obtained by the polymerization of methyl methacrylate (methyl ester of alpha-methacrylic acid) and to methods for the manufacture of the same.

The molding industry has long been searching for a satisfactory thermoplastic molding resin. Heat stable thermoplastic resins are preferred because this type of resin can be molded in large cross sections, whereas thermal hardening resins cannot be molded in large cross sections without over-curing on the surfaces before the centers of the pieces are properly welded. In order to be useful for molding purposes resins must be hard and tough so that articles prepared from them are not easily broken and destroyed. Satisfactory resins must be colorless, transparent, and stable against darkening by heat in order that glass-like, colorless articles and delicately tinted articles can be molded therefrom. The above qualifications eliminate all commonly known synthetic resins but polyvinyl acetate, polystyrene, and polymerized mixtures of vinyl acetate and vinyl chloride. However, the relatively low temperatures at which articles prepared from these resins can be deformed seriously limit their usefulness for molding purposes. Articles prepared from polyvinyl acetate are soft enough to be readily deformed below 45° C., polymerized mixtures of 20% vinyl acetate and 80% vinyl chloride below 70° C., and polystyrene below 75° C. (Softening temperature as used herein denotes that temperature at which a 2" molded disc, $\frac{3}{16}$" thick, becomes sufficiently plastic that it can be permanently bent between the thumb and forefinger.)

There exists a long felt need for such a resin which will remain rigid and firm at temperatures safely above 100° C., for example, in contact with boiling water for a long period of time. Cellulose derivatives, such as cellulose nitrate, cellulose acetate, and ethyl cellulose, do not meet this rigid requirement. In order to make a cellulose derivative sufficiently tough and shock-resistant for molding purposes, it must be compounded with quantities of plasticizers which cause the resultant molded articles to be plastic and easily deformed in boiling water.

It has previously been proposed (Rowland Hill application Ser. No. 641,113) to prepare valuable resinous bodies by the polymerization of methyl methacrylate. The product so obtained is a tough, hard material which in massive form is clear and colorless, is softened by heat enough to be deformed only at temperatures of 85–100° C., and is well adapted for use in the production of molded articles. Polymerized methyl methacrylate as prepared by Hill is, in fact, superior in range of usefulness to any known synthetic resin.

I have now prepared a greatly improved form of methyl methacrylate polymer characterized by a softening temperature of about 125° C., i. e. 25–40° higher than that of previously known compositions. This new methyl methacrylate polymer has a softening temperature safely above 100° C. and can be left in contact with boiling water for long periods of time without becoming plastic or deformed. Furthermore, molded articles prepared from this new polymer retain their shapes, thin discs having been stored for a year's time without warpage or failure of any kind.

The improved methyl methacrylate polymer herein described has a softening temperature well above that of any commonly known colorless thermoplastic molding composition, including cellulose derivative compositions and known synthetic resins. It can be used with a margin of safety where a molded article must stand temperatures as high as 115° C. without deformation, thus filling a unique position in the plastics field.

While in one aspect thereof the invention is not limited to a specific method of procedure, the method best adapted for the preparation of the new material involves in general the admixture of a solution of polymerized methyl methacrylate as prepared by Hill with a liquid in which the polymer is insoluble whereby the polymer is precipitated. The precipitate is then separated from the liquid and thoroughly dried. Comparison of the original methyl methacrylate polymer with the product thus obtained shows that the latter has a softening temperature 25° or more higher than the original polymer.

Although the invention is not restricted to any theory or explanation thereof, my experiments indicate that the higher softening temperature of the product is probably due to the removal of unpolymerized methyl methacrylate and/or partially polymerized (very low molecular weight polymers) methyl methacrylate, which in prior materials has resulted in a low softening temperature.

The results obtained by the practice of the invention are technically of the greatest importance and were not to be predicted. Methods previously used for removal of volatile materials from resinous products, namely, heat, either at atmospheric pressure or in vacuum, seasoning of thin sheets, steam distillation, extraction, etc., do not convert the previously known methyl methacrylate polymer to material having the high softening temperature of the product herein described. Furthermore, methyl methacrylate polymer prepared in massive form is obtained in large, hard, tough, blocks which are not suited directly for molding, and much difficulty is encountered in grinding or pulverizing this material. By the method herein described, the polymer is obtained in small porous flakes which are well adapted for direct use in molding and because of the small particle size may be readily dissolved.

The invention is not limited to the use of any specific method or agent for polymerizing. While heat alone may be used, other polymerizing agents, either alternatively or additionally, as, for instance, light (especially ultra-violet light) and/or catalysts such, for example, as benzoyl peroxide, may be employed.

In the following examples the invention is described in more detail with particular reference to certain specific and preferred methods for the practice thereof. It is understood that the examples are merely illustrative and that the invention is not limited thereto.

*Example 1.*—Methyl methacrylate is heated in a closed container for 72 hours at 65° C. The resultant product is a hard, tough, glass-clear mass. This material is adapted for the preparation of molding compositions, and numerous other uses. It softens at about 85° C. If 10 parts by weight of this material is dissolved in 90 parts acetone and the resultant solution mixed with 400 parts methanol, a white precipitate is obtained which on washing with methanol and drying at 65° C. is found to soften only at 125° C. Essentially the same type of product is obtained regardless of whether the solution of polymer is added to the methanol or the methanol is added to the polymer solution.

*Example 2.*—A solution of 20 parts by weight methyl methacrylate, 80 parts acetone, and 0.1 part benzoyl peroxide was stored at 65° C. for four days. A viscous solution of polymer was obtained. This solution was diluted with 50 parts acetone and poured with stirring and mixing into 350 parts of water. The methyl methacrylate polymer was precipitated as a flaky material which was filtered off and dried. The product has essentially the characteristics of that obtained in Example 1.

*Example 3.*—A solution of 20 parts by weight methyl methacrylate, 80 parts toluene, and 0.2 part benzoyl peroxide was heated at 100° C. for ten hours under a reflux condenser. The somewhat viscous solution thus produced was poured with stirring into 350 parts of methanol. The methyl methacrylate polymer was precipitated as a flaky mass which on filtering off and drying exhibited substantially the properties of the product of Example 1.

*Example 4.*—6.6 parts by weight of methyl methacrylate, 29 parts glycol dimethyl ether, and 0.05 part benzoyl peroxide are maintained at 65° C. for twenty-four hours. The solution of polymer thus obtained is then poured into at least 65 parts of water, whereupon the polymerized methyl methacrylate precipitates and may be washed with water, then with methanol, and thoroughly dried.

*Example 5.*—Under certain circumstances, precipitation of the resin is more advantageously effected if non-solvent for the polymer is added to the resin solution almost to the precipitation point of the polymer before adding the resin solution to the large body of non-solvent liquid. For example, 15 parts by weight of methyl methacrylate, 85 parts acetone, and 0.15 part benzoyl peroxide was maintained at 65° C. for 72 hours. The somewhat viscous solution thus produced was diluted with a solution composed of 80% methanol and 20% water until the solution became cloudy. The cloudy solution was poured with stirring into a solution composed of 320 parts methanol and 80 parts water. The polymer separated as a flaky precipitate which after filtering and drying exhibited substantially the properties of the product of Example 1.

It will be understood that the particular solvents specified in the foregoing examples are not essential to the invention. Thus, for example, as polymer precipitant other alcohols than methanol, e. g. ethanol, may be employed, as may gasoline and similar aliphatic or alicyclic hydrocarbons or mixtures of water and water-miscible solvents for monomeric methyl methacrylate. In all of the above examples the composite liquid from which the polymer is precipitated, is a solvent for the monomer although each individual component of the composite liquid need not be a solvent for the monomer. In order to get the new high softening point polymer it is, of course, necessary that the mother liquor be capable of holding the monomer in solution at least until the polymer can be removed. As polymeric methyl methacrylate solvents other ketones may be used instead of the acetone specified; also other polyethers of glycol may be employed, as may esters, such as ethyl acetate or halogenated aliphatic hydrocarbons, such as ethylene dichloride. It is preferable to use solvents which are readily volatilized at temperatures below that at which the polymeric methyl methacrylate will flow, in order that removal of solvent from the polymer may be facilitated.

It will be apparent that in accordance with this invention, I have prepared a thermoplastic resin which, in addition to all the advantages of the previously known methyl methacrylate polymer, namely, clearness, transparency, freedom from color, hardness, toughness, water resistance, acid resistance, alkali resistance, and stability against darkening on long exposure to heat or light, is especially excellent for use in the film-forming, impregnating, and molding arts because of its higher softening temperature.

Various changes may be made in the methods and details hereinbefore described without departing from the invention or sacrificing any of the advantages thereof.

I claim:

1. Process of polymerizing methyl methacrylate which comprises subjecting methyl methacrylate to polymerizing conditions while dissolved in a liquid which is a solvent for polymeric methyl methacrylate and subjecting the solution, after at least partial polymerization has been effected, to the action of a liquid adapted to cause precipitation of polymeric methyl methacrylate from said solution without precipitating monomeric methyl methacrylate.

2. In the manufacture of resinous materials by polymerization of methyl methacrylate the step of mixing with a solution of at least partially polymerized methyl methacrylate a liquid adapted to effect precipitation of polymerized methyl methacrylate therefrom without precipitating monomeric methyl methacrylate.

3. In the manufacture of resinous materials by polymerization of methyl methacrylate the step of mixing with a solution of at least partially polymerized methyl methacrylate a liquid adapted to effect precipitation of polymerized methyl methacrylate therefrom without precipitating monomeric methyl methacrylate, and separating, washing, and drying the precipitated material.

4. In the manufacture of resinous materials by polymerization of methyl methacrylate the step of adding to a solution of at least partially polymerized methyl methacrylate a liquid adapted to effect precipitation of polymerized methyl methacrylate therefrom, the amount of said liquid precipitant being sufficient to render the solution cloudy, and thereafter adding the resultant mixture to a body of said liquid precipitant and thereby effecting precipitation of the polymerized methyl methacrylate, said liquid precipitant being of such character that, in the proportions used, it does not precipitate monomeric methyl methacrylate.

5. Process as in claim 2 in which the precipitating liquid is methanol.

6. Process as in claim 2 in which the precipitating liquid is a mixture of water and a water-miscible solvent for monomeric methyl methacrylate.

7. As a new composition of matter, polymerized methyl methacrylate having a softening temperature of not less than 115° C. and being obtainable by subjecting methyl methacrylate to polymerizing conditions while dissolved in a liquid which is a solvent for polymeric methyl methacrylate and subjecting the solution, after at least partial polymerization has been effected, to the action of a liquid adapted to cause precipitation of polymeric methyl methacrylate from said solution without precipitating monomeric methyl methacrylate.

DANIEL E. STRAIN.